United States Patent Office 2,945,602
Patented July 19, 1960

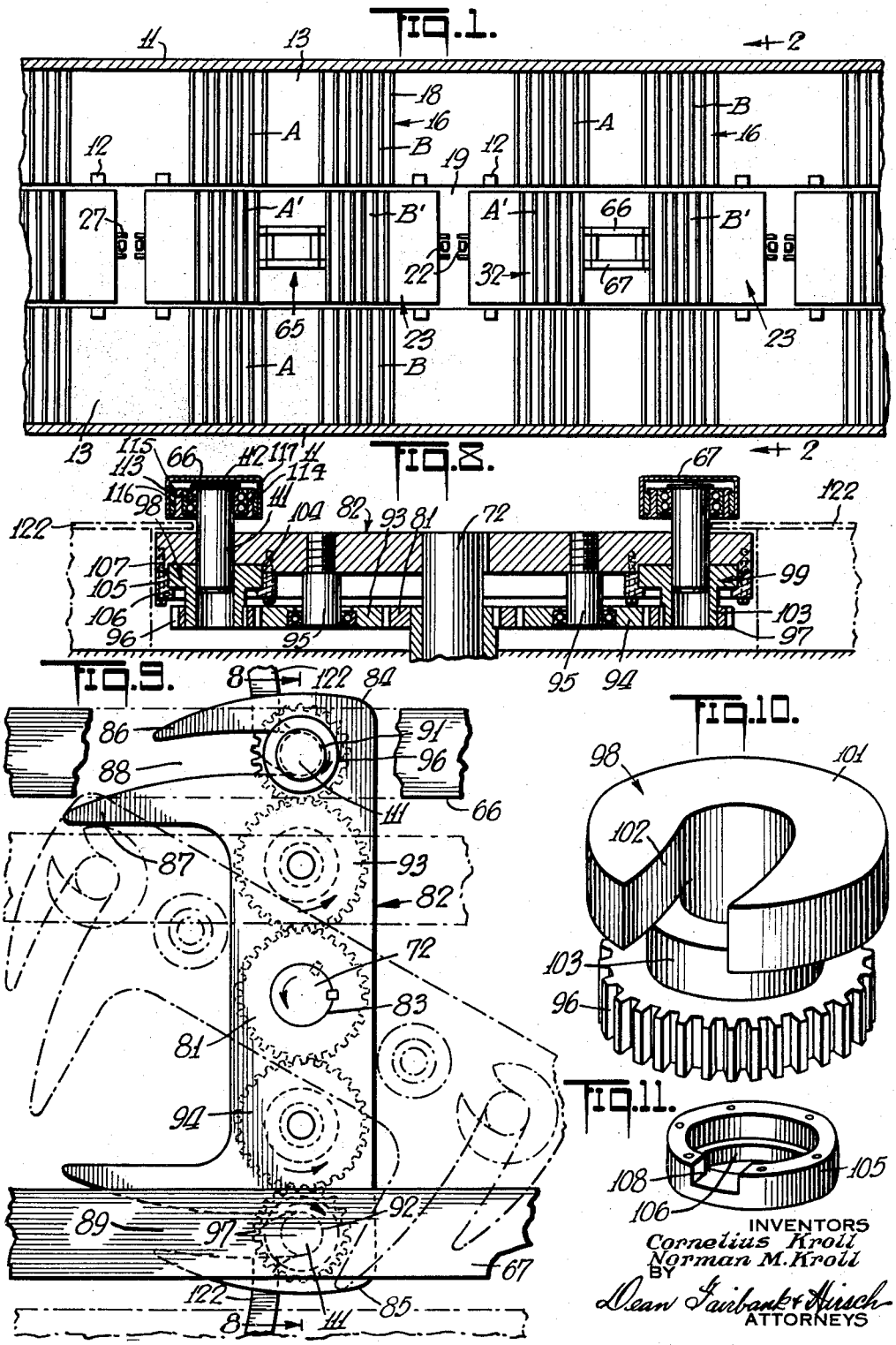

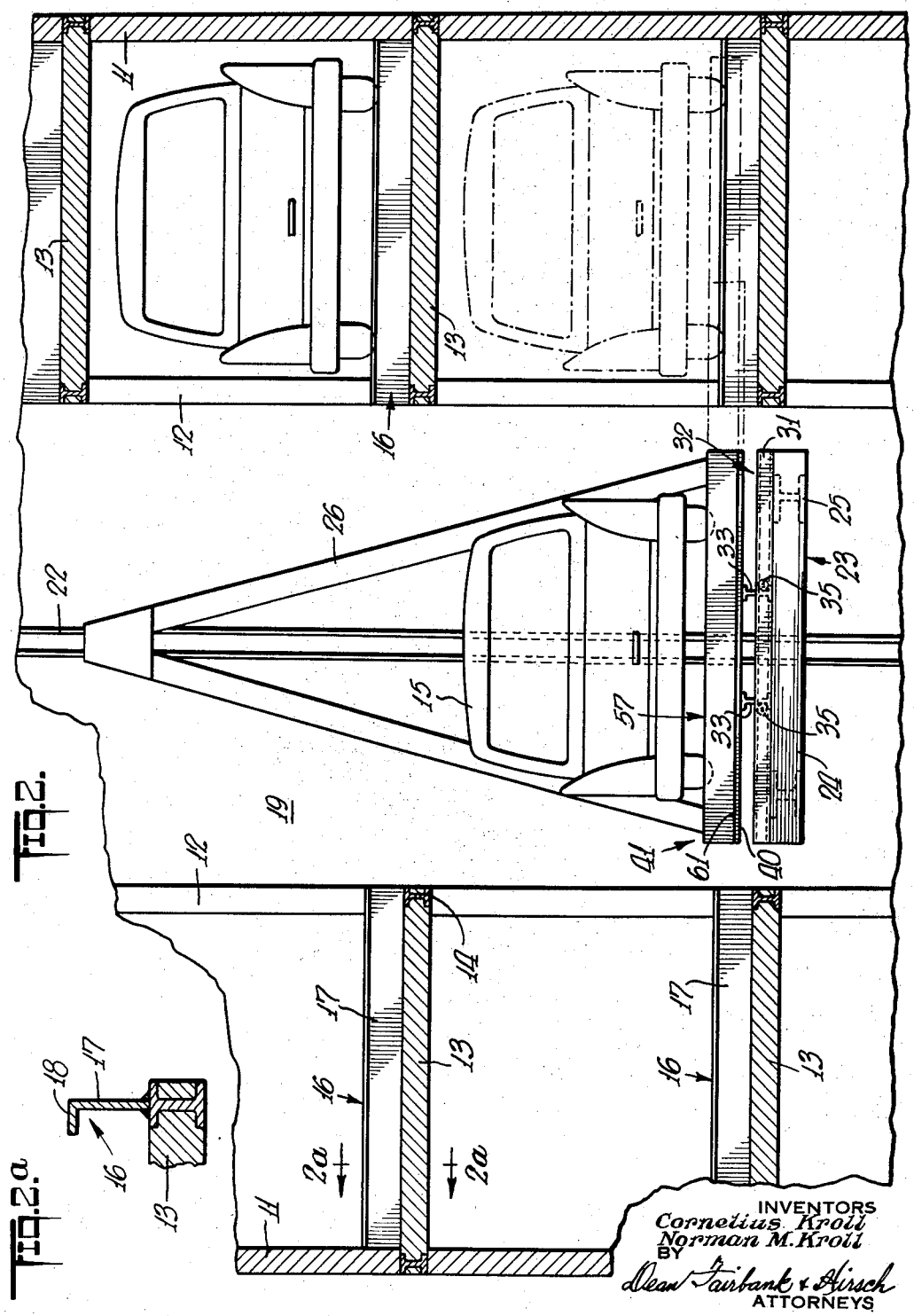

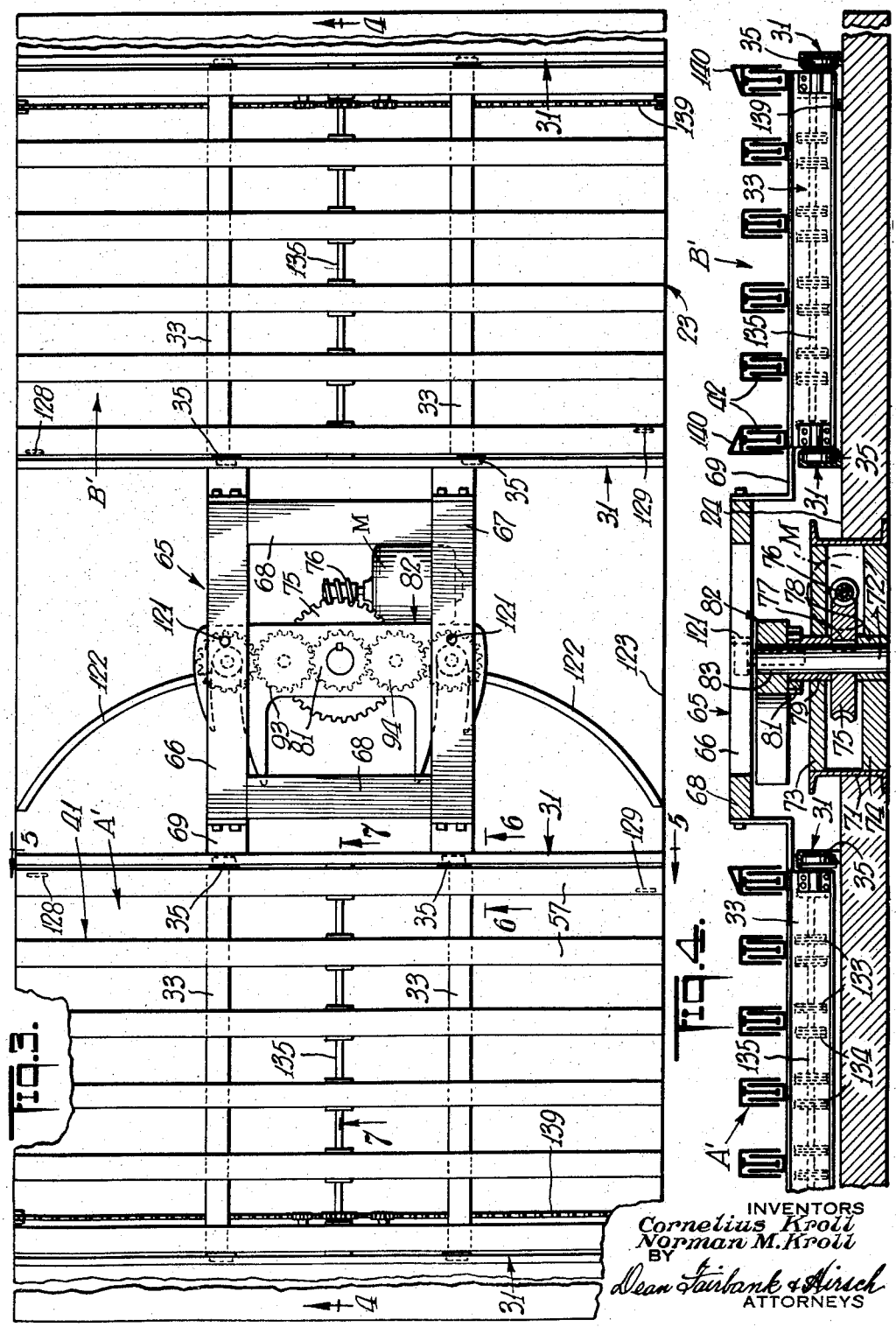

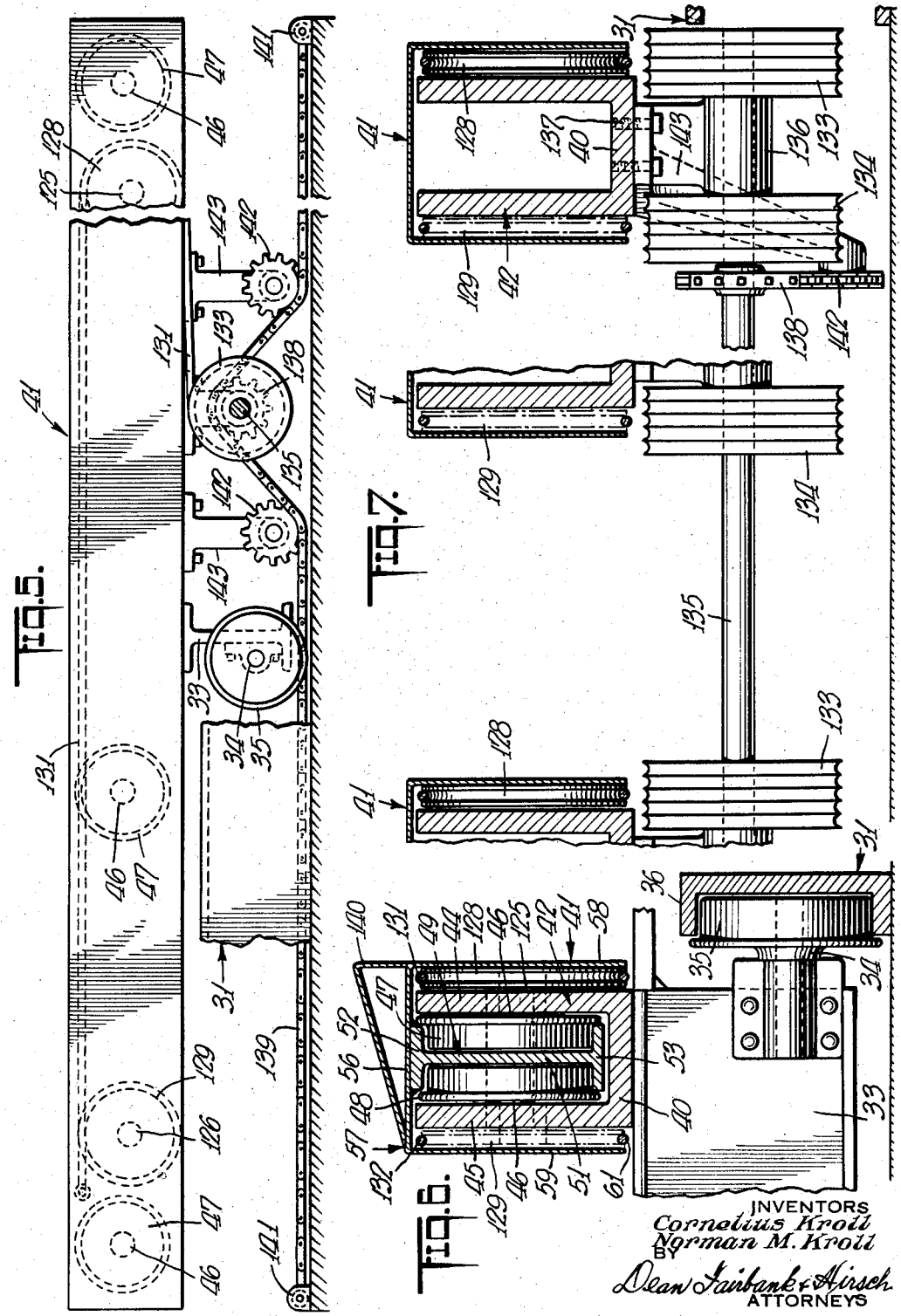

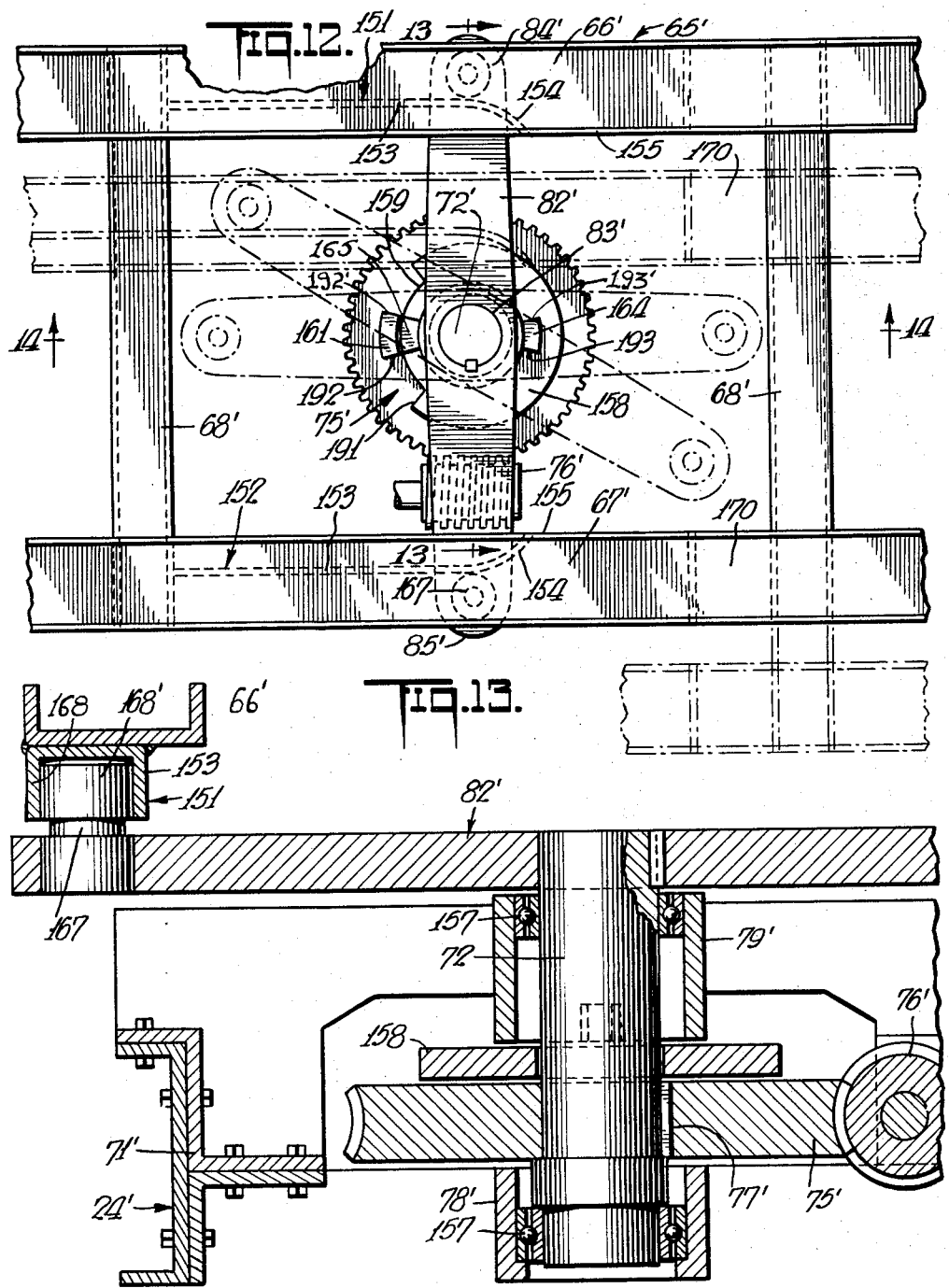

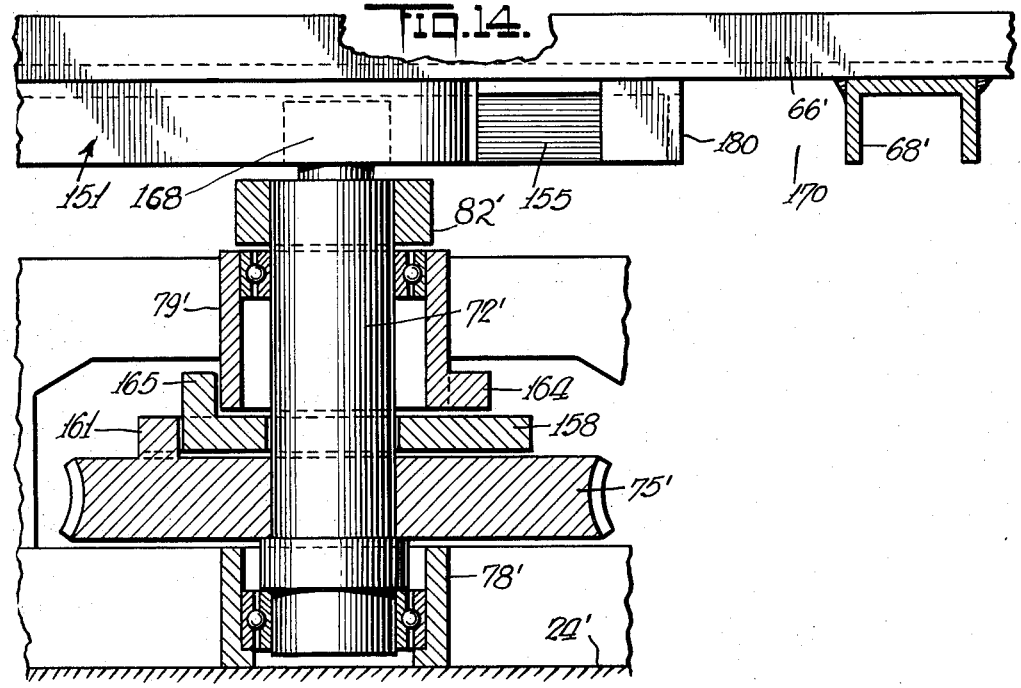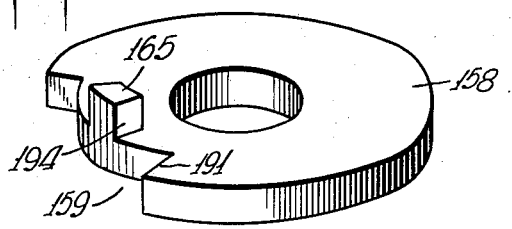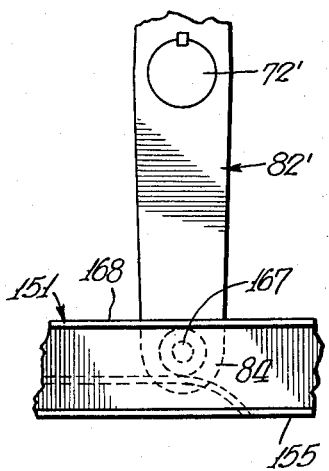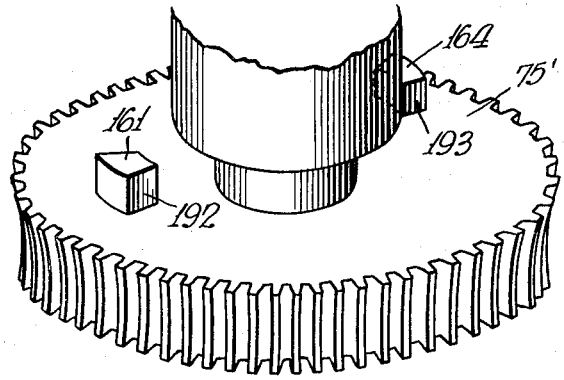

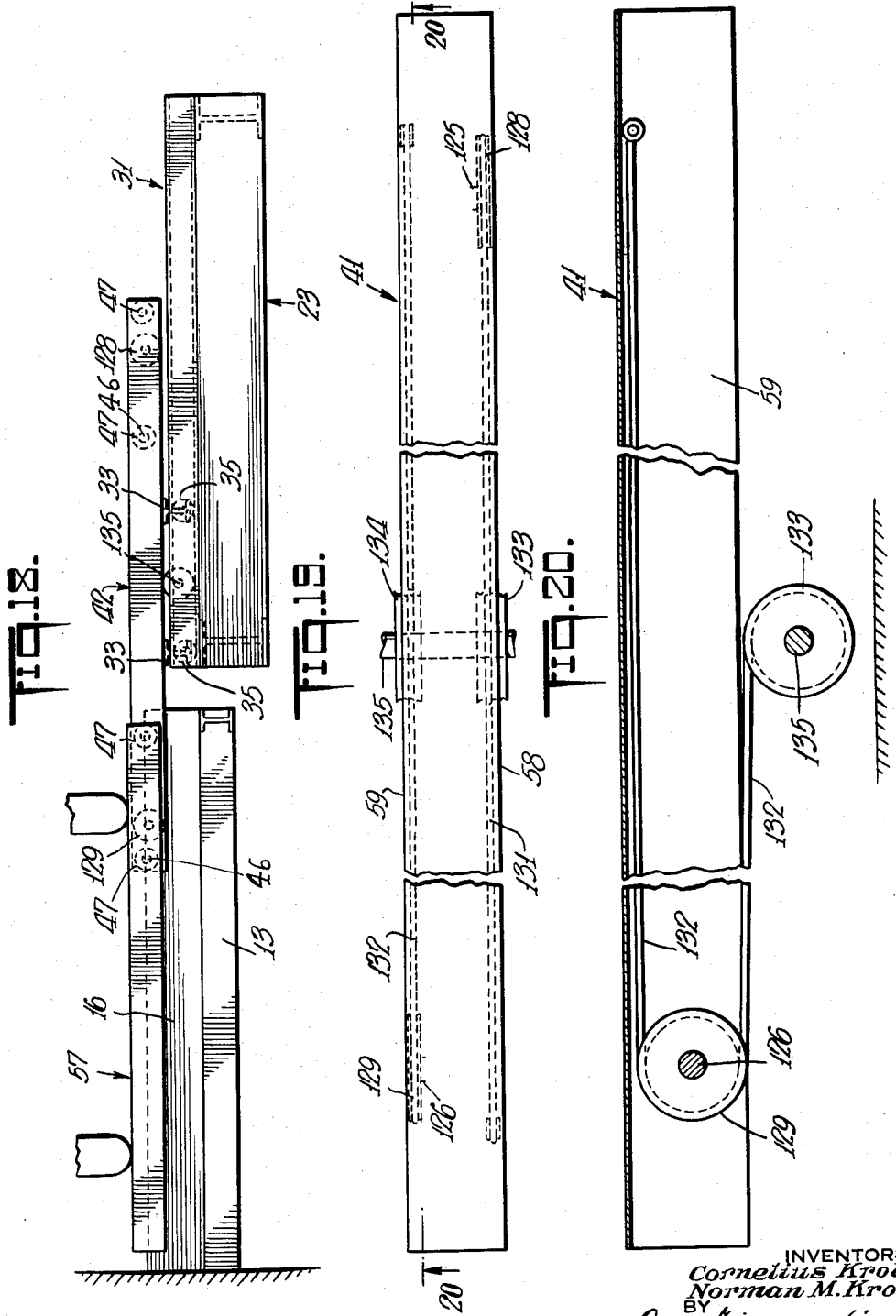

2,945,602

TRANSFERRING APPARATUS

Cornelius Kroll, Houston, Tex., and Norman M. Kroll, New York, N.Y., assignors to Speed Park, Inc., a corporation of New York Filed Jan. 29, 1957, Ser. No. 636,995

6 Claims. (Cl. 214—16.1)

This invention relates to the art of transferring apparatus and more particularly to apparatus for parking automobiles.

Where automobiles are parked in vertically aligned stalls or on platforms by means of an elevator having a conveyor on which the vehicle is initially positioned and which elevator is moved vertically into substantial alignment with such stalls so that the conveyor may thereon be moved transversely into the stall to deposit the automobile therein and where the supporting structure for the stall necessitates heavy beams that require bulky supports that occupy considerable vertical space, the overall height of the installation will be increased with resultant increase in cost thereof.

It is accordingly among the objects of the invention to provide an installation of the above type that is relatively simple in construction and dependable in operation, which will accommodate a relatively large number of vehicles in a minimum of space and will, with the use of a relatively simple control system, provide automatic and rapid parking of automobiles without need for an attendant in the vehicle or the need for manual chocking of the vehicle or locking of its brakes and without the need for jacks or the like to raise the weight of the automobile off its wheels or the need for ramps and heavy floors, ceilings and walls found in conventional garage structures and which will also provide automatic and rapid return of parked automobiles to the customers.

Another object is to provide an installation of the above type which permits vehicles to be parked into and removed from stalls on either side of a central position.

Still another object is to provide an installation of the above type having a plurality of vertically aligned stalls into which vehicles may respectively be positioned and removed.

According to one aspect of the invention, a plurality of vertically aligned stalls are provided in a building structure, each having a plurality of parallel troughs and crests which may be formed by spaced parallel beams extending inwardly from the supporting wall of the building and desirably supported at their inner ends by a cross beam which in turn may be supported by the structural vertical columns or beams of the frame of the building in which the stalls are installed. Associated with the stalls is a shaft in which a vertically movable elevator is positioned, the elevator mounting a conveyor movable toward and away from the stalls. The conveyor may comprise a plurality of spaced parallel elongated members, each having a primary member, all of which are joined together and movable in unison toward and away from the stalls and a secondary member, each having an associated drive means. The drive means are connected so that upon movement of the primary members in unison, the secondary members will be individually and simultaneously moved outwardly therefrom and respectively positioned in the troughs between the beams of the stalls, the secondary members entering the troughs above the cross beam connected to the beams of the stall.

In the accompanying drawings, in which are shown one or more of various possible embodiments of the several features of the invention, Fig. 1 is a diagrammatic plan view of the installation, Fig. 2 is a transverse sectional view thereof taken along line 2—2 of Fig. 1, Fig. 2a is a detailed sectional view taken along line 2a—2a of Fig. 2, Fig. 3 is a plan view of the elevator and conveyor thereon, Fig. 4 is a sectional view taken along line 4—4 of Fig. 3, Fig. 5 is a view taken along line 5—5 of Fig. 3 with parts broken away, Fig. 6 is a transverse sectional view taken along line 6—6 of Fig. 3, Fig. 7 is a view similar to Fig. 6 taken along line 7—7 of Fig. 3, Fig. 8 is a sectional view taken along line 8—8 of Fig. 9, Fig. 9 is a top plan view with parts broken away of the crank bar, Fig. 10 is a perspective view on an enlarged scale of a portion of the locking mechanism, Fig. 11 is a view similar to Fig. 10 on a smaller scale of another portion of the locking mechanism, Fig. 12 is a top plan view of the drive mechanism according to another embodiment of the invention, Fig. 13 is a sectional view taken along line 13—13 of Fig. 12, Fig. 14 is a view similar to Fig. 13 taken along line 14—14 of Fig. 12, Fig. 15 is a perspective view of the locking ring member of the embodiment shown in Fig. 12, Fig. 16 is a perspective view of the worm gear, Fig. 17 is a fragmentary perspective view of the crank bar of the embodiment of Fig. 12 in another position, Fig. 18 is a side elevational view illustrating the operation of the equipment, Fig. 19 is a plan view of one of the conveyor elements, and Fig. 20 is a view taken along line 20—20 of Fig. 19 with parts broken away.

Referring now to the drawings, as shown in Figs. 1 and 2, the parking installation comprises a building structure having opposed vertical side walls 11 and supporting columns 12 located inwardly of said side walls and spaced by a distance slightly greater than the length of a conventional automobile 15, the space between each pair of columns 12 defining a stall. Extending laterally inward from each of the side walls 11 are vertically spaced horizontal shelves 13 transversely aligned as shown, with the inner end of each of said shelves 13 having a horizontal structural beam 14 supported by the columns 12.

Positioned on each of the shelves 13 and extending at right angles to the side walls 11 are a plurality of elongated beams 16 each substantially L-shaped in cross section as shown in Fig. 2a, having the lower edge of its vertical leg 17 affixed to the shelf 13, the horizontal legs 18 of the beams 16 being spaced from each other as shown in Fig. 1.

The beams 16, which extend the width of the shelves and define troughs and crests, are desirably formed in two groups A and B, as shown in Fig. 1, each of sufficient width to support respectively the front and rear wheels of the automobile 15 to be positioned thereon in the manner hereinafter to be described.

The vertical space 19 between the aligned columns of shelves 13 defines an elevator shaft which may have a plurality of pairs of transversely aligned vertical guide rails 22, as shown in Figs. 1 and 2, each to guide an elevator 23 for vertical movement or if desired, one elevator mounted on a horizontally movable carriage may be positioned in the space 19.

As shown in Fig. 2, the elevator comprises a floor structure 24 which may include a plurality of structural beams 25 secured together to form a rigid rectangular unit of length and width of sufficient size as to accommodate a conventional automobile. The floor 24 which is of width, as shown in Fig. 2, considerably less than the spacing between transversely aligned shelves 13, has secured to each end the base of an A frame 26, the top of which is guided by the vertical rails 22 which also guide the central portion of each end of the floor 24 (Fig. 1) as at 27. Through suitable cables connected to the upper end of the A frame the elevator may be raised and lowered as desired.

Secured to the floor 24 at right angles to its length and extending the width thereof, are two pairs of parallel spaced tracks 31 (Fig. 3) each track illustratively being U-shaped in cross section as shown in Fig. 6. Riding on the tracks is a conveyor 32 which has two sections A' and B'. Each of the sections A' and B' comprises a pair of beams 33 (Figs. 3, 5 and 6) illustratively I-beams which extend transversely between each pair of tracks 31. Each end of the beams 33 mounts a stud shaft 34 carrying a flanged wheel 35 that rides on the tracks 31, the horizontal upper legs 36 of said tracks preventing upward movement of said wheels 35 and the flanges of said wheels preventing lateral movement thereof.

Mounted on the beams 33 and extending at right angles thereto is a plurality of parallel spaced telescoping members 41 which form part of the conveyor 32. Each member 41 comprises a primary member illustratively a U-shaped beam 42 of length substantially equal to the width of the floor 24 as shown in Fig. 2, the cross piece 40 of each beam 42 being affixed as by welding to the beams 33.

Affixed at one end to each of the side walls 44, 45 of each of the beams 42 as shown in Fig. 6 and extending inwardly therefrom is a plurality of pairs of transversely aligned stud shafts 46 longitudinally spaced along the length of said beams. As illustratively shown in Fig. 18, four pairs of such stud shafts are provided, two pairs being positioned adjacent each end of said beam. Rotatably mounted on each of the stud shafts 46 is a flanged wheel 47, the flange 48 of said wheels being adjacent the associated side walls 44, 45. The wheels 47 rotatably support a secondary member illustratively an elongated I beam 49 of length substantially equal to that of the beam 42. The vertical portion 51 of the beam 49 extends between the pairs of transversely spaced wheels 47 with the upper flange 52 of the beam 49 riding on said wheels and the lower flange 53 thereof positioned between the bottoms of the wheels 47 and the cross piece 40 of beam 42 thereby preventing vertical and lateral movement of the beam 49, yet permitting longitudinal movement thereof with respect to beam 42.

Mounted on the upper flange 52 of the beam 49 and secured thereto as by welding is the elongated cross piece 56 of an inverted U-shaped member 57 which extends the length of said beam 49. The depending side walls 58, 59 of the member 57 extend parallel to the outer surface of the legs 44, 45 of beam 42 and are spaced therefrom as is clearly shown in Fig. 6, the lower edges 61 of said side walls 58, 59 being closely adjacent the undersurface of the cross piece 40 of the beam 42.

Means are provided to effect movement of the sections A' and B' of the conveyor from the central position shown in Figs. 1 and 3 toward and away from the shelves.

To this end, as shown in Figs. 3 and 4, a substantially rectangular frame 65 is provided positioned between the sections A' and B' of the conveyor. The frame comprises a pair of spaced parallel cross beams 66, 67 formed from inverted U-shaped members and extending at right angles to the members 41. The ends of the cross beams which are closed, are joined by parallel beams 68 and the cross beams are secured as by brackets 69 to the beams 33 so that the sections A' and B' and frame 65 form an integral unit.

Mounted on the floor 24 of the elevator and centrally positioned thereon is a housing 71 which has a vertical shaft 72 rising therefrom. Positioned between the top and bottom walls 73 and 74 of the housing is a worm gear 75 engaged by a worm 76 driven by a motor M also mounted in floor 24. The gear 75 is keyed to said shaft 72 as at 77, and the housing 71 desirably has bushings 78 and 79 rigid therewith through which the shaft extends. Affixed to bushing 79 (Fig. 4) above the top wall 73 of the housing is a gear 81, said shaft 72 extending beyond said gear 81 and mounting a crank member 82 thereon. As shown in Fig. 9, the crank member comprises an elongated bar having a central opening 83 through which the upper end of the shaft 72 extends, said shaft being keyed to said bar. Each of the ends 84, 85 of the bar has a pair of spaced laterally projecting fingers 86 and 87 which define an arcuate slot 88, 89 therebetween, the outermost finger 86 being of shorter length than the innermost finger 87. The ends of both of said fingers extend to a line which is the circumference of a circle having the axis of shaft 72 as its center.

As shown in Figs. 4 and 8, the crank bar 82 is positioned in a plane below that of the cross beams 66, 67 and in the neutral position of the crank bar, as shown in Figs. 3 and 9, the closed ends 91, 92 of each of the slots 88 and 89 is aligned with the associated cross beams 66 and 67.

The gear 81 which is fixed with respect to the housing 71 meshes with a pair of idler gears 93 and 94 rotatably mounted on stud shafts 95 depending from the crank bar 82 on each side of the central opening 83 therethrough. The idler gears 93 and 94 mesh respectively with gears 96 and 97, illustratively of smaller diameter than gears 93, 94, each of said gears 96, 97 serving to operate a locking member 98, 99 shown in Figs. 8 and 10. The locking member comprises a disc 101 having a radial arcuate notch 102 therethrough and having a stem 103 to the lower end of which an associated gear 96 and 97 is affixed.

Means are provided rotatably to mount the locking members on the crank bar 82. To this end, for example, referring to the locking member 98 which is substantially identical to member 99, the crank bar 82 on its undersurface, concentric with the rear end of arcuate slot 88 has a substantially arcuate recess 104 therein in which the disc 101 is positioned. An annular housing 105 (Fig. 11) with an inwardly extending flange 106 at its lower edge is secured as by screws 107 to the undersurface of the crank bar coaxial with the arcuate recess 104 therein. The housing 105 has a cutout 108 therethrough and the radial arcuate notch 102 in the disc 101 may be moved into alignment with such cutout in the manner hereinafter to be described. The housing 105 serves as a bearing for the disc 101 so that it is free to rotate.

Extending into the central portion of each of the discs 101 through the ends of arcuate slots 88, 89 in crank bar 82 is a heavy pin 111 of strong rigid material such as steel. The upper end of each of the pins has a head 112 and a bearing 113 encompasses said pin adjacent its upper end as is clearly shown in Fig. 8. The outer race of the bearing 113 is positioned in a roller 114 which has an inwardly extending flange at its lower end to support the outer race of the bearing, said outer race and said roller desirably being secured as by force fit. The roller on its outer periphery has spaced flanges 115 which straddle an elongated rail 116 affixed to the side walls 117 of the cross beams 66, 67 and extending the length thereof.

As shown in Fig. 3, each of the cross bars has a stop member 121 which is adjacent the roller 114 when the latter is in the neutral position shown, to limit movement of said roller to the right. In addition, the floor 24 of the elevator 23 mounts a curved upstanding guide plate 122 having its inner end adjacent the pin 111 and clear of the latter and its outer end adjacent the side edges 123 of the elevator and aligned with the left ends of the cross beams 66, 67.

Means are provided controlled by the movement of the frame 65 to effect movement of the beam 49 and the member 57 thereon with respect to the U-beam 42 to position the respective members 57 in the troughs between the spaced parallel beams 16 of the stalls.

To this end, as shown in Figs. 5, 6 and 18, a stud shaft 125, 126 respectively is affixed at one end to each of the side walls 44, 45 of the beam 42 and extends laterally outwardly therefrom into the space between the walls 44, 45 and the associated side walls 58, 59 of the member 57. As is clearly shown in Figs. 3 and 5, the stud shaft 125 is at one end of the wall 44 and the other stud shaft 126 is at the other end of the wall 45, said stud shafts being positioned inwardly of the rollers 47 near each end of the beam 42 and rotatably mounting respectively pulleys 128, 129. As shown in Fig. 5, a cable 131 is affixed at one end to the end of wall 58 of member 57 adjacent the pulley 129 which is on wall 45 and extends substantially the length of the wall 58 riding around the pulley 128. Similarly, a cable 132 is affixed at one end to the end of wall 59 of cover 57 adjacent the pulley 128 which is on wall 44 and extends substantially the length of wall 59 riding around the pulley 129.

The free ends of cables 131, 132 are wound respectively around associated pairs of drums 133, 134. As shown in Figs. 3, 5 and 7, the pairs of drums 133 and 134 which are associated with each of the members 41 are secured to a shaft 135 rotatably mounted in a bearing 136 secured as by screws 137 to the members 42 adjacent the tracks 31 of each of the sections A', B'.

Secured to the shaft 135 inwardly of the pair of drums 133, 134 associated with the tracks 31 are sprocket wheels 138 over which rides a sprocket chain 139 shown in Fig. 5 affixed at its ends 141 to the floor 24 of the elevator and extending parallel to the tracks 31.

As is clearly shown in Figs. 5 and 7, a pair of idler sprocket wheels 142 straddle the sprocket wheel 133 and are supported on inwardly inclined brackets 143 affixed to the cross piece 40 of beam 42. As shown in Fig. 5, the sprocket wheels 142 are longitudinally aligned with the sprocket wheel 133 and have their lower edges adjacent the floor of the elevator 23, the sprocket chain 139 riding against said idler sprocket wheels.

In the operation of the equipment with the elevators at, say, the ground floor level, represented for example by the lowermost shelves 13, shown in Fig. 2, an automobile is driven at right angles to the beams 16 so that its front and rear wheels will rest respectively on sections A and B of such beams. Thereupon, with the elevator positioned so that the top surface of members 57 is slightly below the level of the horizontal legs 18 of beams 16, the drive motor M is energized. As a result, the worm 76 thereof will rotate worm gear 75 in say, a counterclockwise direction from the position shown in Fig. 3 to effect rotation of the shaft 72 and crank bar 82 thereon in a similar direction. As the shaft 72 is rotated in a counterclockwise direction, the gears 96 and 97 will rotate in a clockwise direction (Fig. 9) by reason of the drive imparted thereto from the fixed gear 81 through the idler gears 93, 94.

Referring to Fig. 9, as the end 84 of the crank bar 82 moves in a counterclockwise direction, the end 91 of arcuate slot 88 will engage the pin 111 to move the latter in a circular path along beam 66. At the same time, by reason of the rotation of gear 96, the disc 101 of locking member 98 will be rotated in a clockwise direction so that the notch 102 therein will be moved further out of alignment with the arcuate slot 88 to retain the pin 111 locked in such slot. The movement of the pin 111 in a counterclockwise direction will cause the latter, through the roller 114 thereon to react against the cross beam 66 moving the frame 65 in a downward direction from the position shown in Fig. 3 or to left, referring to Fig. 2.

Due to such rotation of the shaft 72, the end 85 of the crank bar 82 shown in Fig. 9 will also move in a counterclockwise direction so that the closed end 92 of the arcuate slot 89 will move away from the associated pin 111. Inasmuch as the gear 97 of locking member 99 is moving in a clockwise direction, the notch 102 in disc 101 of locking member 99 will move into alignment with arcuate slot 89 to release the associated pin 111 through opening 108 in housing 105.

As the frame 65 moves downwardly from the position shown in Figs. 3 and 9, it is apparent that the pin 111 associated with the end 85 of crank bar 82, which is retained in the cross beam 67, will also move downwardly, the curve of the arcuate slot 89 permitting such movement of the pin which has been released from the associated locking member 99 by the rotation of the disc 101.

With continued rotation of the crank bar, the rate of travel of the frame 65 will increase rapidly and correspondingly decrease when the crank bar has made 180 degree rotation. Thus, there will be little movement imparted to the frame at the beginning and end of such 180 degree travel. When the crank bar 82 has completed such 180 degree movement by reason of the drive imparted to the gear 96, the disc 101 of locking member 98 will have rotated sufficiently to completely lock the associated pin 111 with respect to the crank bar 82, and the pin 111 associated with locking member 99 will have been completely released and will have moved downwardly from the position shown in Fig. 3, completely clear of crank bar 82 so that it is located in cross beam 67 somewhere between the stop 121 carried thereby and the guide plate 122.

Due to such movement of the frame, as above described, by reason of the rigid connection of the cross beams 66, 67 to the beams 33, the sections A' and B', and members 41 thereon will be moved to the left from the position shown in Fig. 2.

As sections A' and B' move to the left, the sprocket wheel 138, shown in Figs. 5 and 7, carried thereby will also move to the left so that it will be rotated in a clockwise direction by its reaction against the fixed sprocket chain 139 to rotate shaft 135 and the drums 133, 134 thereon in a corresponding direction. As a result of such rotation of the drums, the cables 132 on drums 134 will be taken up and the cables 131 on drums 133 will be played out. Take up of the cables 132 on drums 134 will cause tension to be applied to the side walls 59 of the members 57 to move the latter to the left, the beams 49 carrying the members 57 riding readily on rollers 47.

It is apparent that the speed of movement of the members 57 is dependent upon the relative diameters of the drum 134 with respect to sprocket wheels 138 for the greater the relative diameter of such drums, the more that the cable 132 will be taken up for a given amount of travel of the sections A' and B'.

As is clearly shown in Fig. 18, the movement of the members 57, above described, will cause such members to enter the troughs between the beams 16 of the stall on the lowermost shelf 13. The height of telescoping members 41 is less than that of the vertical leg 17 of the L-shaped beam 16, so that such members 41 may enter the spaces between the shelf 13 and the tires of the automobile resting on the horizontal legs 18 of beams 16.

When the members 57 are fully extended, which will occur when the crank bar has rotated 180 degrees, a limit switch may be provided to de-energize the motor M. As the rate of movement of the frame 65 at such time is extremely slight, there would be little chance for the crank bar 82 to move further than 180 degrees and even if there was any slight additional travel of the crank bar 82 this would have no harmful effect as it would only tend to retract the conveyor slightly from its fully extended position. At this time through appropriate controls, the elevator may be raised slightly to cause the outstanding members 57 to rise vertically to lift the automobile from the beams 16 as is shown in Fig. 18. By reason of the inclined members 140 affixed to the members 57 at each side of each of the sections A' and B', the wheels of the automobile will not roll off the associated section even if the brakes are not locked.

Thereupon, the motor M is energized in reverse direction so that the shaft 72 driven thereby will rotate in a clockwise direction as will the crank bar 82. As the result of such movement, inasmuch as the disc 101 of locking member 98 associated with beam 66 has been rotated by gear 96 to fully lock the associated pin 111, the clockwise rotation of the crank bar will cause the disc 101 to react against the pin 111 to move the latter also in a clockwise direction thereby moving the frame 65 in an upward direction, as shown in Fig. 3, or to the right, referring to Fig. 2. This movement of the frame is also sinusoidal in effect being relatively slow at the beginning and end of the 180 degree rotation of the crank bar 82. As the frame moves, the gear 96 will be rotated by the drive previously described, but the associated disc 101, though tending to move from locked toward unlocked position, will remain locked even when it is restored to the neutral position shown in Fig. 3. As the frame moves upwardly to the position shown in Fig. 3, or to the right to the position shown in Fig. 2, the pin 111 carried by the cross beam 67 will abut against the guide plate 12 and be cammed toward the stop 121. The pin 111 during the course of such movement, will enter the arcuate slot 89 in crank bar 82 and be guided thereby through the opening 108 in housing 105 and through the notch 102 in disc 101, which will have been moved into alignment with the arcuate slot, against the end 92 of such slot and thereupon when the crank bar 82 has been moved to neutral position, the associated pin 111 will also be locked by further rotation of the disc 101 of locking member 99.

The automobile having thus been positioned on the conveyor 32 mounted on the elevator 23 can be raised to a desired floor and deposited into a stall on either side of the elevator shaft 19.

To illustrate the complete operation of the equipment, it will be assumed that the automobile is to be deposited into a stall on the right side of the shaft 19. To this end, with the frame 65 in the neutral position shown, and with the elevator 23 positioned through suitable controls so that the tops of members 57 are slightly above the top level of beams 16 as shown in Fig. 18, the motor M is energized to drive the shaft 72 in a clockwise direction. Consequently, the end 92 of the arcuate slot 89 will react against the associated pin 111 to move the frame upwardly from the position shown in Fig. 3 or to the right referring to Fig. 2. The elevator 23 is then lowered slightly to cause the extended members 57 to drop vertically and thus deposit the automobile onto beams 16. The operation of the conveyor moving in this direction and back to neutral position corresponds to the operation previously described and hence will not be repeated.

Instead of the drive means shown in Figs. 8 and 9, for example, the drive means shown in Figs. 12 to 16 may be used, parts corresponding to those in Figs. 8 and 9 having the same reference numerals primed.

Referring to Fig. 12, the frame 65' also is substantially rectangular, having parallel cross beams 66' and 67' connected by parallel members 68', the ends of the cross beams 66' and 67' being connected to the beams 33 of sections A' and B' to form an integral unit.

Affixed as by welding, as shown in Fig. 13, to the cross beams 66', 67' respectively, are cross heads 151 and 152, illustratively inverted U-shaped members. The members 151 and 152 extend from the left member 68' terminating short of the right member 68' as is clearly shown in Fig. 14. The opposed inner walls 153 of members 151 and 152 taper inwardly as at 154 and each has an opening 155 therethrough clearly shown in Fig. 14, the purpose of which will be hereinafter described.

Mounted in the floor 24' of the elevator and centrally positioned thereon is a housing 71' which has a vertical shaft 72' rising therefrom. Affixed to shaft 72' as by keying at 77' is a worm gear 75' engaged by a worm 76' driven by a motor (not shown) also mounted on the floor 24' of the elevator. The housing 71' desirably has bushings 78' and 79' rigid therewith through which the shaft 72' extends, suitable bearings 157 being positioned in said bushings rotatably to mount the shaft 72'. Idly mounted on the shaft 72' between the bushings 78' and 79' is a stop ring member 158 which has an arcuate notch 159 in its periphery, illustratively occupying 100 degrees of arc. The worm gear 75' has on its upper surface a dog 161 which may be formed integral therewith and which illustratively occupies 30 degrees of arc. The dog 161 is positioned in the arcuate notch 159 in the stop ring 158 as is clearly shown in Fig. 12. Affixed to the upper end of shaft 72' extending beyond the upper bearing 157 in bushing 79', is a crank bar 82', the latter having a central opening 83' therein through which the shaft 72' extends, said crank bar 82' being secured to the shaft 72' as by keying. The crank bar 82' is so positioned on the shaft 72' that it will extend at right angles to the center line of the dog 161 rigid with the worm gear 75' as is clearly shown in Fig. 12. With the crank bar 82' so positioned, it will also extend at right angles to a dog 164 affixed as by welding to the bushing 79' and diametrically opposed to the dog 161 on the gear 75'. The dog 164 on the bushing 79' also occupies 30 degrees of arc as does a dog 165 affixed to the ring member 158 midway between the ends of arcuate notch 159.

Each of the ends 84' and 85' of the crank bar 82' has an opening in which is affixed an upstanding pin 167, the upper end of which illustratively mounts a roller 168' which is positioned between the inner and outer walls 153, 168 of each of the cross heads 151, 152 is clearly shown in Fig. 13.

In the operation of the equipment with the drive means shown in Figs. 12 to 16, with the elevator say at the ground floor level, represented, for example, by the lowermost shelves 13, shown in Fig. 2, an automobile is driven at right angles to the beam 16 so that its front and rear wheels will respectively rest on sections A and B of such beams. Thereupon, with the elevator positioned so that the top surface of member 57 is slightly below the level of the horizontal legs 18 of beams 16, the worm 76' is driven by the associated drive motor (not shown) to rotate worm gear 75' in say a counterclockwise direction from the position shown in Fig. 12. This will cause rotation of the shaft 72' and the crank bar 82' thereon in a similar direction. As the shaft 72' is rotated in a counterclockwise direction, the pin 167 at the end 84' of crank bar 82' will react against the side wall 153 of cross head 151 tending to move the frame 65' in a downward direction from the position shown in Fig. 12, or to the left referring to Fig. 2. As the frame 65' moves downwardly inasmuch as the end 85' of the crank bar 82' will also move in a counterclockwise direction, the pin 167 carried thereby will be guided by the curved portion 154 of the side wall 153 of cross head 152 through opening 155 in wall 153 so that such pin is clear of said cross head.

With continued rotation of the crank bar 82', the rate of travel of the frame 65' will increase rapidly and correspondingly decrease when the crank bar has made 180 degree rotation to effectively provide a sinusoidal rate of travel. Thus, there will be little movement imparted to the frame at the beginning and end of such 180 degree travel. As the crank bar 82' moves through an 180 degree arc, by reason of the downward movement of the frame 65' from the position shown in Fig. 12, the pin 167 at the end 85' of the crank bar 82' will pass through the space 170 defined between the end 180 of the cross head 151 and the right member 68' so that it is completely clear of the cross head 151.

Due to such movement of the frame 65' as above described, by reason of the rigid connection of the cross beams 66' and 67' to the I beams 33, the sections A' and B' and members 41 thereon will be moved to the left from the position shown in Fig. 2. As the result of such movement due to the drive previously described, the members 57 will be extended to perform their required functions, all as previously described.

When the members 57 are fully extended, which will occur when the crank bar 82' is rotated 180 degrees from the position shown in Fig. 12, a limit switch may be provided to de-energize the motor driving shaft 72'. As the rate of movement of the frame 65' at such time is extremely slight, there would be little chance for the crank bar 82' to move further than 180 degrees and even if there was any slight additional travel of the crank bar 82' this would have no harmful effect as it only tends to retract the conveyor slightly from its fully extended position.

In the remote contingency that the limit switch (not shown) should cut off erroneously when the pin 167 at the end 84' of crank bar 82' was aligned with opening 155 in cross head 151, which would be in a position several degrees further in a counterclockwise direction from that illustratively shown in Fig. 17, due to the inertia tending to move the frame 65' upwardly at such time due to such over-travel, the frame 65' may move past the pin 167 so that both of the pins 167 would be clear of the associated cross heads, rather than the single pin 167 associated with cross head 152 which is required. In such a contingency the equipment would have to be manually reset. To prevent this over-travel, which is unlikely, the dogs 161, 164 and 165 and the stop ring member 158 are provided.

Thus, referring to Fig. 12, when the crank bar 82' initially starts its movement, the dog 161 carried by worm gear 75' will abut against the end 191 of the arcuate notch 159 thereupon causing the ring member 158 to rotate in a counterclockwise direction from the position shown in Fig. 12.

As the dog 164 mounted on the bushing 79' affixed to the housing is initially diametrically opposed to the dog 161 carried by the worm gear 75', as previously described, and as both of such dogs occupy 30 degrees of arc, it is apparent that the leading edge 192 of dog 161 which engages the end 191 of the arcuate notch 159, which occupies 100 degrees of arc, will become aligned with the edge 193 of the dog 164 affixed to the bushing when the worm gear 75' has rotated 150 degrees. Inasmuch as the arcuate notch 159 occupies 100 degrees of arc and the dog 165 carried by the ring member 158 occupies 30 degrees of arc, the edge 191 of the notch 159 is spaced from the edge 194 of dog 165 by an angle of 35 degrees. Consequently, the worm gear 75' will be able to rotate 35 degrees further before the dog 165 abuts against the fixed dog 164 to restrain further rotation of the worm gear 75'.

This restraint of movement after 185 degrees rotation of the crank bar 82' will prevent movement of the pin 167 carried by end 84' thereof to a position in which it is in alignment with the opening 155 in cross head 151. Hence, there is no likelihood of sufficient over-travel of the frame 65' as previously described to cause the pin 167 carried by end 84' of crank bar 82' to be moved out of the cross head 151 which would interfere with subsequent operation of the equipment and require manual resetting thereon.

At this time, through appropriate controls, the elevator may be raised slightly to cause the outstanding members 57 to rise vertically to lift the automobile from the beams 16.

Thereupon the motor driving shaft 72' is energized in reverse direction so that the shaft 72' will rotate in a clockwise direction as will the crank bar 82'. As the result of such movement, inasmuch as the pin 167 carried by the end 84' of the crank bar 82' is still between the walls 153 and 168 of the cross head 151, it will react against the wall 168 tending to move the frame in an upward direction from the position shown in Fig. 17. This movement of the frame is also sinusoidal in effect being relatively slow at the beginning and end of the 180 degree rotation of the crank bar 82'. As the frame 65' moves upwardly, the pin 167 carried by the end 85" of the crank bar 82' will move through the opening 170 between the end of the cross head 151 and the right cross member 68' and through opening 155 in wall 153 of cross head 152 to again be positioned between the side walls 153 and 168 of cross head 152 as shown in Fig. 12.

The automobile having thus been positioned on the conveyor mounted on the elevator 23 can be raised to a desired floor and deposited into a stall on either side of the elevator shaft 19.

To illustrate the complete operation of the equipment, it will be assumed that the automobile is to be deposited into a stall on the right side of the shaft 19. To this end, with the frame 65' in the neutral position, shown in Fig. 12, and with the elevator at a level such that the tops of members 57 are slightly above the top level of the beams 16 of the right stall, the motor is energized to drive the shaft 72' in a clockwise direction. Consequently, the pin 167 at the end 85' of crank bar 82' will react against the side wall 153 of cross head 152 to move the frame 65' upwardly from the position shown in Fig. 12 or to the right referring to Fig. 2. The elevator is then lowered slightly to cause the extended members 57 to drop vertically and thus deposit the automobile on beams 16. The operation of the conveyor moving in this direction and back to neutral position corresponds to the operation previously described and hence will not be repeated.

When the worm gear moves in a clockwise direction, it will also move 150 degrees before the edge 192' of dog 161 thereon is aligned with the edge 193' of dog 164 affixed to the bushing 79'. Thereupon, the ring member 158 will move 35 degrees additionally before the dog 165 thereon abuts against dog 164 to restrain further movement of the worm gear 75' to prevent the pin 167 at end 85' of crank bar 82' moving clear of cross head 152 as previously described with respect to cross head 151.

By reason of the bi-sinusoidal movement imparted to the frame by the drive mechanism above described, the drive mechanism may be relatively compact, thereby cutting down the size of the installation and in addition as the conveyor, when retracted onto the elevator, will have very little speed, it is not likely to overshoot and extend sufficiently beyond the edge of the elevator so as to interfere with vertical movement thereof. Any slight overshoot is adequately taken care of by the clearance provided between the inner ends of the stalls and the adjacent edges of the elevator. If desired, a relatively simple brake mechanism could be used to immediately restrain rotation of the shaft 72 or 72' upon de-energization of the associated motor M, for since the rate of movement of the frame is relatively slow at such time, little braking effect is required. The bi-sinusoidal arrangement inherently provides both a braking action and a static brake.

It is also to be noted that as the rate of movement of the members 57 with respect to the beams 42 may be varied depending upon the relative diameters of the drums 133, 134 and sprocket wheel 138, the members 57 may be fully extended between the beams 16 of the stall while the beams 42 have only partially extended therebetween. As a result, less heavy structure may extend outwardly from the elevator so that the size and weight of the beams 42 may be held to a minimum inasmuch as a more even distribution of load in the extended position may be carried by beams 42 and 49.

As the members 49 are individually extended and retracted, they require no connection therebetween and hence the shelves forming the floors of the stalls may be connected at their inner ends in the manner described, eliminating the need for heavy supporting structure which would be required if the extending members of the conveyor were joined, as such connection between the members 49 would require the shelves to be formed only of spaced beams without transverse support at their inner ends for movement of the conveyor members 49 therebetween.

Although the equipment has been illustratively shown and described with respect to its application in parking of automobiles, it is of course to be understood that it could be used to transfer crates, boxes, merchandise and the like and the use of the equipment for this purpose is within the scope of the invention.

It is further to be understood that although a plurality of vertically aligned stalls are shown, the equipment could be used on a single level installation. In such case the elevator could be mounted so as to move at right angles to the stalls into transverse alignment therewith.

As the control mechanism for automatically operating the equipment in timed sequence forms no part of this invention and would be obvious to one skilled in the art, it has not been described.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desired to secure by Letters Patent of the United States is:

1. An installation for transferring automobiles, comprising a vertical supporting structure, a horizontal platform comprising a plurality of parallel alternating troughs and crests extending outwardly from said support, means extending transversely across said platform supporting the latter near its outer end, a second horizontal platform, means to effect vertical movement of said second platform with respect to said first platform, a conveyor mounted on said second platform, said conveyor comprising a plurality of spaced parallel horizontal members, each of said members including an elongated primary member and an elongated secondary member, both adapted to be longitudinally aligned with one of said troughs, the outer ends of said horizontal members being in juxtaposition with the outer end of an associated trough when longitudinally aligned therewith, means interconnecting said primary members adjacent their central portion to form a rigid assembly, means slidably mounting said assembly on said second platform, means slidably mounting said secondary members on the associated primary member for movement longitudinally with respect thereto to extend outward thereof, means to retain the inner end of each of said secondary members in engagement with the end of the associated primary member when said secondary member has been extended, means to effect movement of said rigid assembly and drive means associated with each of said secondary members and controlled by the movement of said assembly to effect simultaneous individual horizontal movement thereof when said rigid assembly is moved, whereby each of the secondary members and a portion of the associated primary member will be moved into an associated trough, said drive means comprising a drive shaft extending transversely with respect to said horizontal members, means to rotate said drive shaft, a plurality of pairs of drums associated respectively with said secondary members and driven by said shaft, a plurality of pairs of cables affixed respectively at one end to each of the drums of an associated pair and at their other end to the secondary members near opposite ends thereof, whereby upon movement of said assembly and rotation of said drums by said shaft one of the drums of each pair will take up on its associated cable to advance the associated secondary member and the other of the drums of each pair will play out its associated cable.

2. The combination set forth in claim 1 in which the means to rotate said drive shaft comprises a wheel mounted thereon and an elongated flexible member affixed at each end to said second platform and reacting against said wheel to effect rotation thereof and said shaft in the direction of movement of said connected horizontal members.

3. An installation for transferring automobiles, comprising a vertical supporting structure, a horizontal platform comprising a plurality of parallel alternating troughs and crests extending outwardly from said support, means extending transversely across said platform supporting the latter near its outer end, a second horizontal platform, means to effect vertical movement of said second platform with respect to said first platform, a conveyor mounted on said second platform, said conveyor comprising a plurality of spaced parallel horizontal members, each of said members including an elongated primary member and an elongated secondary member, both adapted to be longitudinally aligned with one of said troughs, the outer ends of said horizontal members being in juxtaposition with the outer end of an associated trough when longitudinally aligned therewith, means interconnecting said primary members adjacent their central portion to form a rigid assembly, means slidably mounting said assembly on said second platform, means slidably mounting said secondary members on the associated primary member for movement longitudinally with respect thereto to extend outward thereof, means to retain the inner end of each of said secondary members in engagement with the end of the associated primary member when said secondary member has been extended, means to effect movement of said rigid assembly and drive means associated with each of said secondary members and controlled by the movement of said assembly to effect simultaneous individual horizontal movement thereof when said rigid assembly is moved, whereby each of the secondary members and a portion of the associated primary member will be moved into an associated trough, said drive means comprising a drive shaft extending transversely with respect to said horizontal members and centrally located on said second platform, a wheel mounted on said drive shaft, an elongated flexible member affixed at each end to said second platform and reacting against said wheel to effect rotation thereof and said shaft in the direction of movement of said assembly, a plurality of pairs of drums mounted on said shaft and associated respectively with said secondary members, a pulley mounted at each end of each of said horizontal members on opposed sides thereof, a plurality of pairs of cables affixed respectively at one end to each of the drums of an associated pair, extending respectively around the pulleys on the horizontal members and affixed at their other end to the secondary members near opposite ends thereof remote from the associated pulley, whereby upon movement of said assembly and rotation of said drums by said shaft one of the drums of each pair will take up on its associated cable to advance the associated secondary member and the other of the drums of each pair will play out its associated cable.

4. Equipment of the character described comprising a platform, a plurality of spaced parallel horizontal members arranged in two parallel sections, each of said horizontal members including an elongated primary member and an elongated secondary member, means to connect the primary members of each of said sections, a pair of spaced parallel members extending at right angles to the spaced parallel horizontal members of said two sections and positioned between said sections, the ends of said pair of members being secured to said two sections to form a rigid unit, means slidably mounting said unit on said platform for movement in either direction with respect to said platform from a central position thereon, means slidably mounting said secondary member on said primary member for movement longitudinally thereof in either direction with respect to said primary member from a central position thereon and a plurality of drive means associated respectively with said secondary members to effect individual movement thereof, a vertical drive shaft centrally located on said platform between said sections, a crank bar centrally mounted on said shaft at right angles thereto, a pair of drive pins associated respectively with said pair of parallel members and adapted to react thereagainst upon rotation of said crank bar and means controlled by the rotation of said drive shaft and movement of said crank bar from a position at right angles to said pair of parallel members to terminate the reaction of one of said pins against the associated parallel member.

5. Equipment of the character described comprising a platform, a plurality of spaced parallel horizontal members slidably mounted on said platform for movement in either direction with respect to said platform from a central position thereon, each of said horizontal members including an elongated primary member and an elongated secondary member, each of said primary members being substantially U-shaped in cross section, means to connect said primary members, each of said secondary members being I-shaped in cross section and positioned between the side walls of an associated primary member, a plurality of pairs of rollers mounted respectively on the side walls of said primary member, said I-shaped member riding on said rollers for slidable movement longitudinally of said primary member in either direction from a central position on said primary member and plurality of drive means associated respectively with said secondary members to effect individual movement thereof.

6. The combination set forth in claim 5 in which an elongated member is affixed to the top of said I-shaped member clear of the upper edges of the side walls of said U-shaped member, said elongated member having depending walls which straddle the side walls of said U-shaped member.

References Cited in the file of this patent

UNITED STATES PATENTS

| | | |
|---|---|---|
| 493,542 | Bessing et al. | Mar. 14, 1893 |
| 1,306,158 | Walker | June 10, 1919 |
| 1,742,205 | Fuqua | Jan. 7, 1930 |
| 1,944,253 | Martin | Jan. 23, 1934 |
| 2,018,360 | Heintges | Oct. 22, 1935 |
| 2,168,527 | Iversen | Aug. 8, 1939 |
| 2,536,068 | Lehmann | Jan. 2, 1951 |
| 2,647,647 | Alimanestiano | Aug. 4, 1953 |
| 2,775,128 | Young | Dec. 25, 1956 |

FOREIGN PATENTS

| | | |
|---|---|---|
| 745,041 | Great Britain | Feb. 22, 1956 |